Dec. 21, 1943.    R. P. STEADMAN ET AL    2,337,526
DOUGH TWISTING MACHINE
Filed Oct. 7, 1941    12 Sheets-Sheet 1
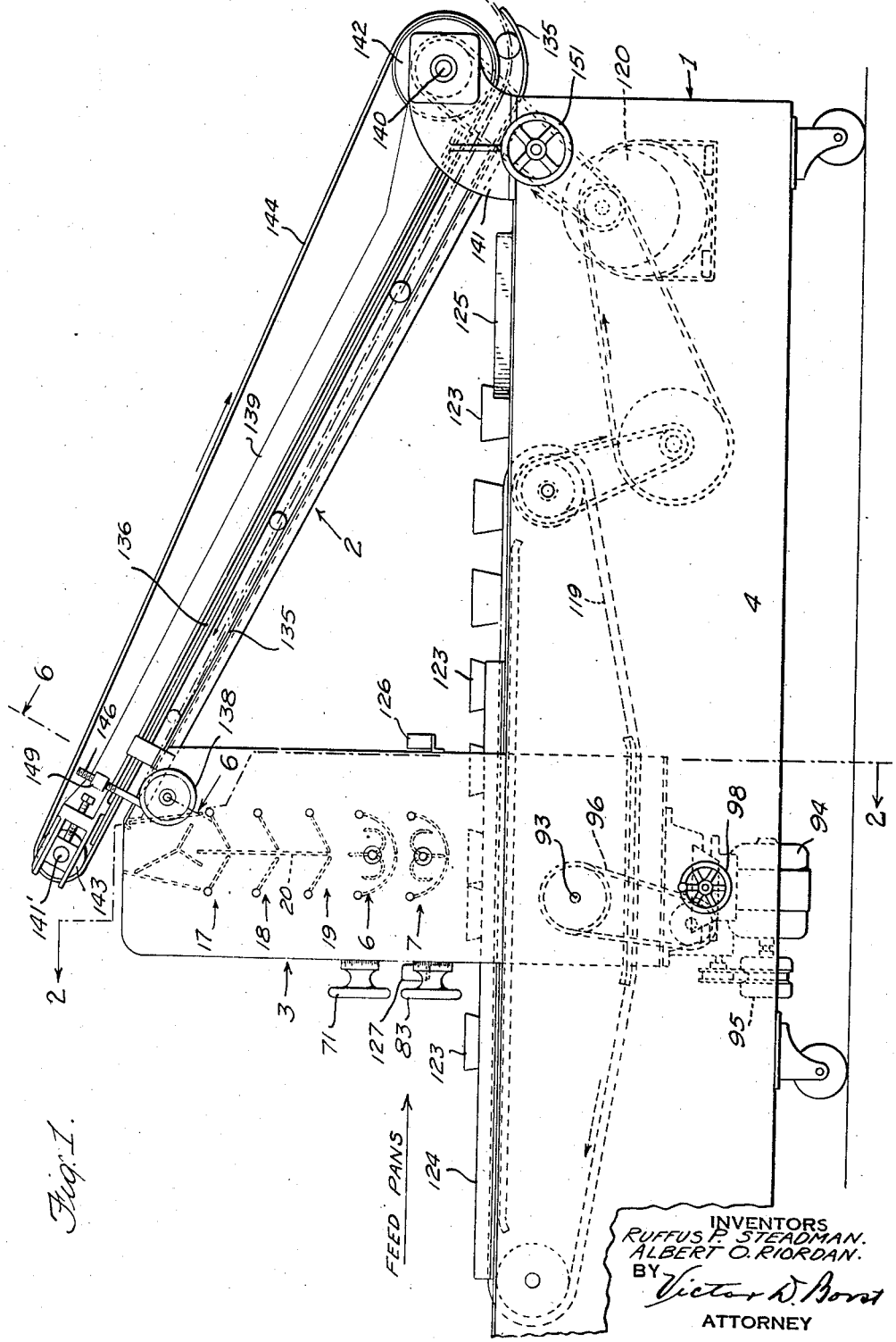
INVENTORS
RUFFUS P. STEADMAN.
ALBERT O. RIORDAN.
BY
ATTORNEY

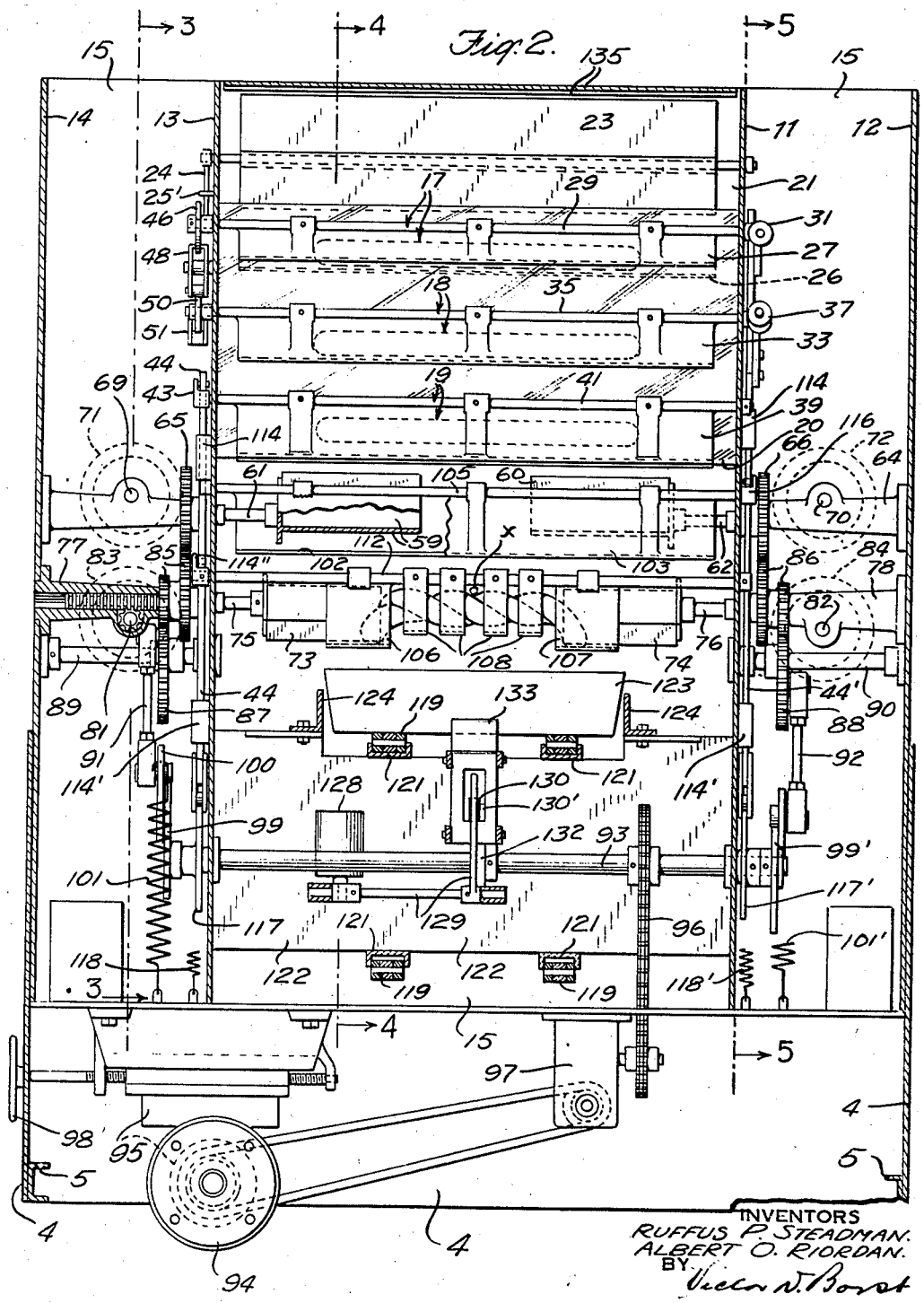

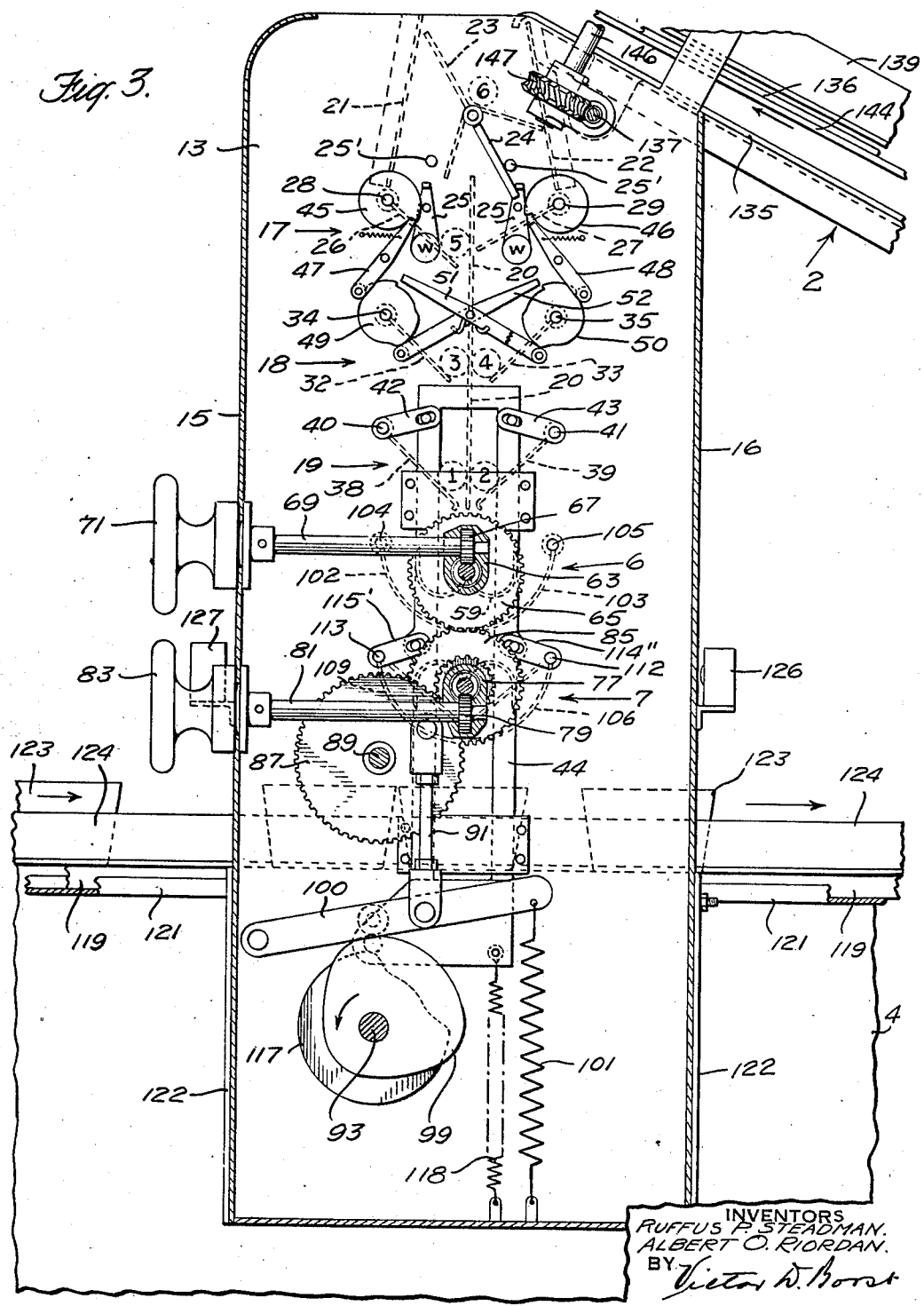

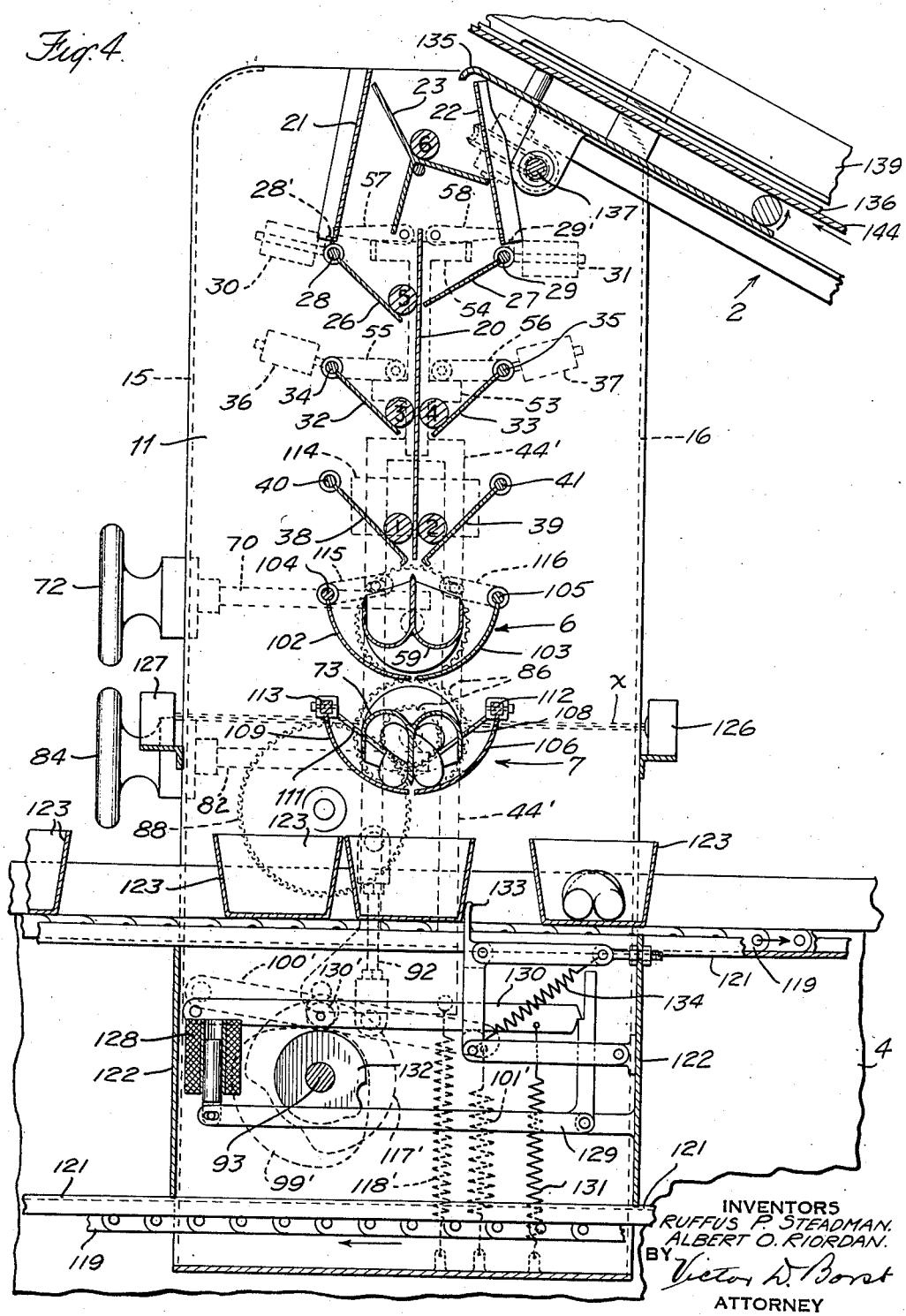

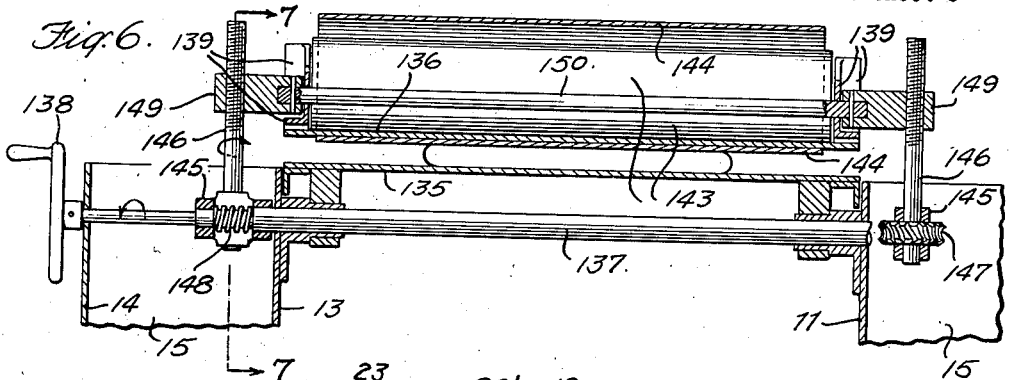

Dec. 21, 1943. R. P. STEADMAN ET AL 2,337,526
DOUGH TWISTING MACHINE
Filed Oct. 7, 1941 12 Sheets-Sheet 7
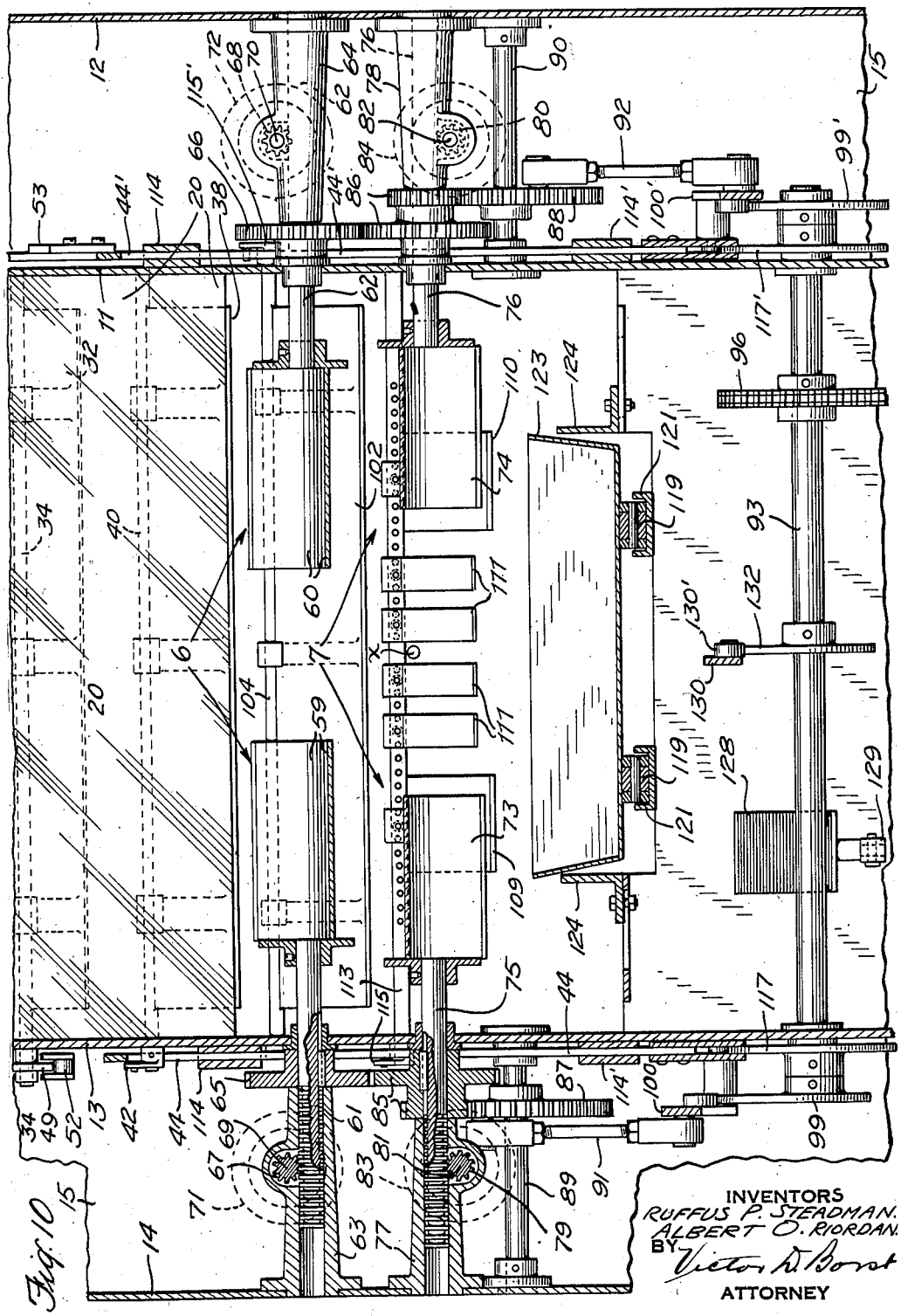
INVENTORS
RUFFUS P. STEADMAN.
ALBERT O. RIORDAN.
BY
ATTORNEY

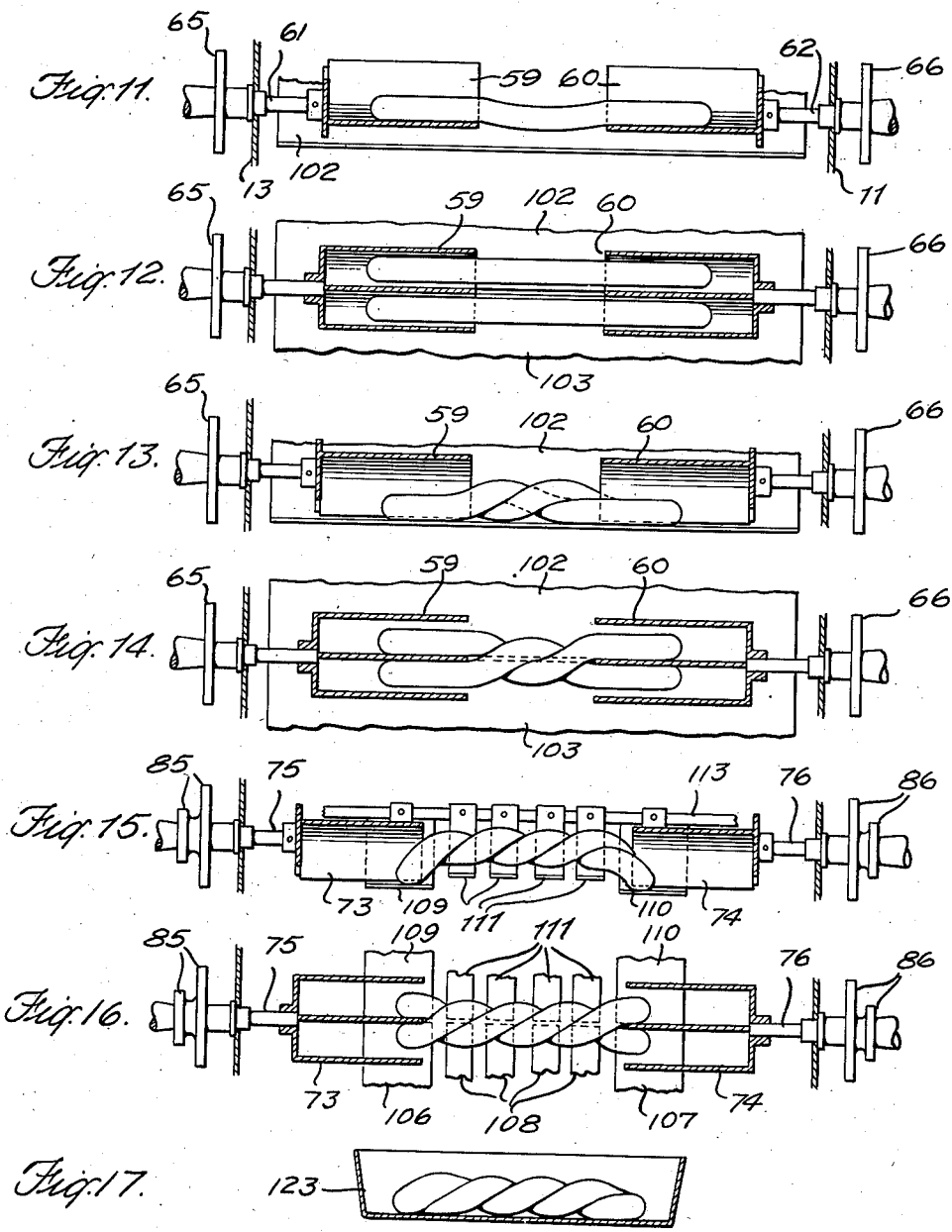

Dec. 21, 1943.    R. P. STEADMAN ET AL    2,337,526
DOUGH TWISTING MACHINE
Filed Oct. 7, 1941    12 Sheets-Sheet 9
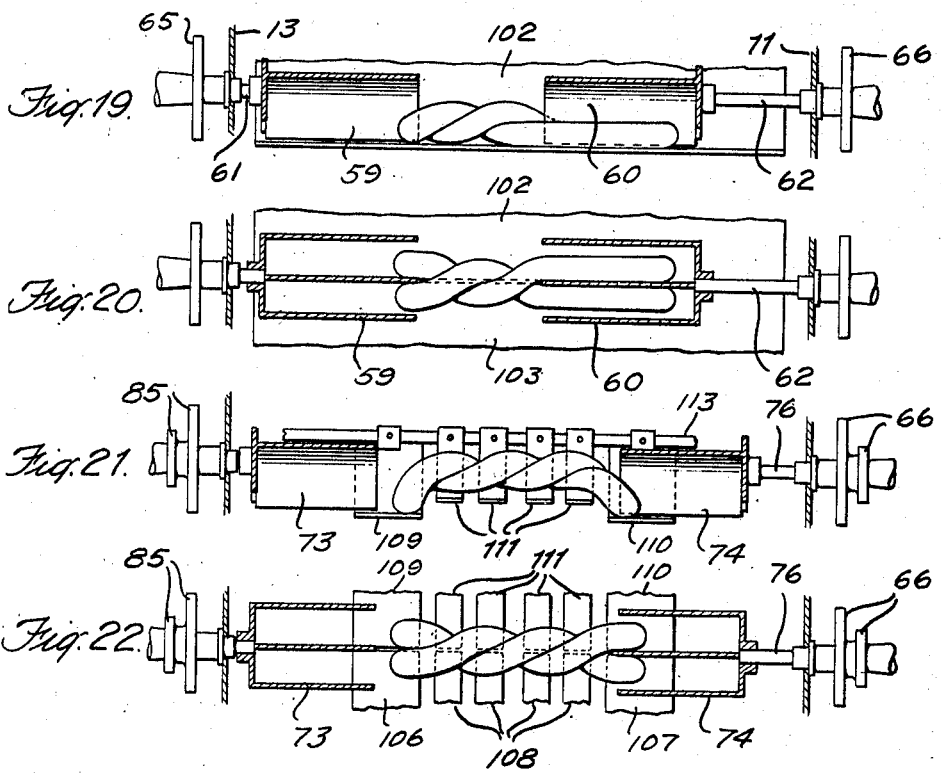
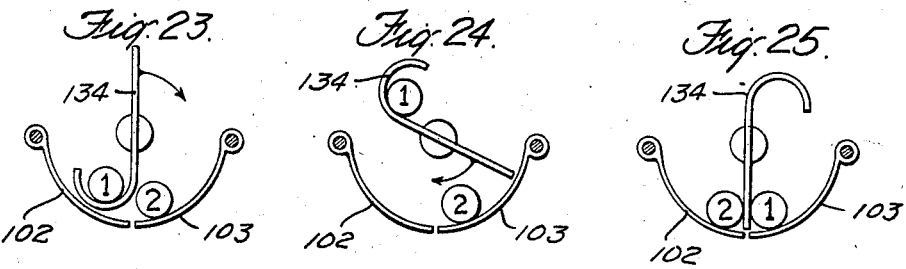
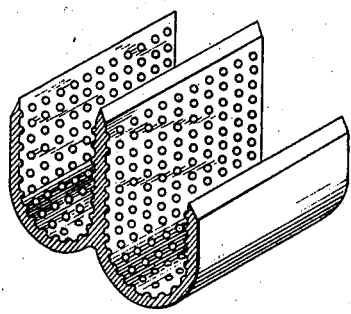
INVENTORS
RUFFUS P. STEADMAN.
ALBERT O. RIORDAN.
BY
ATTORNEY

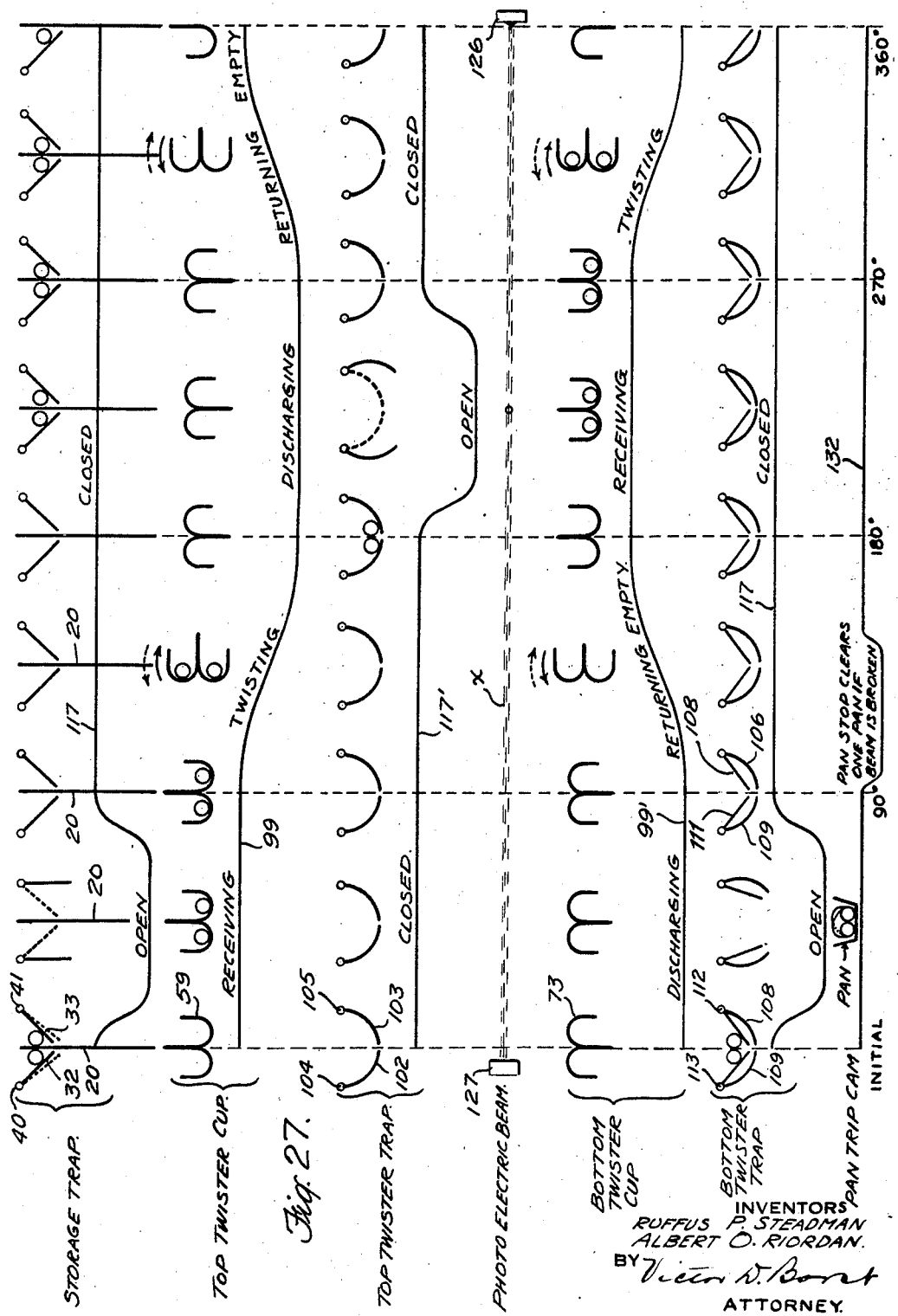

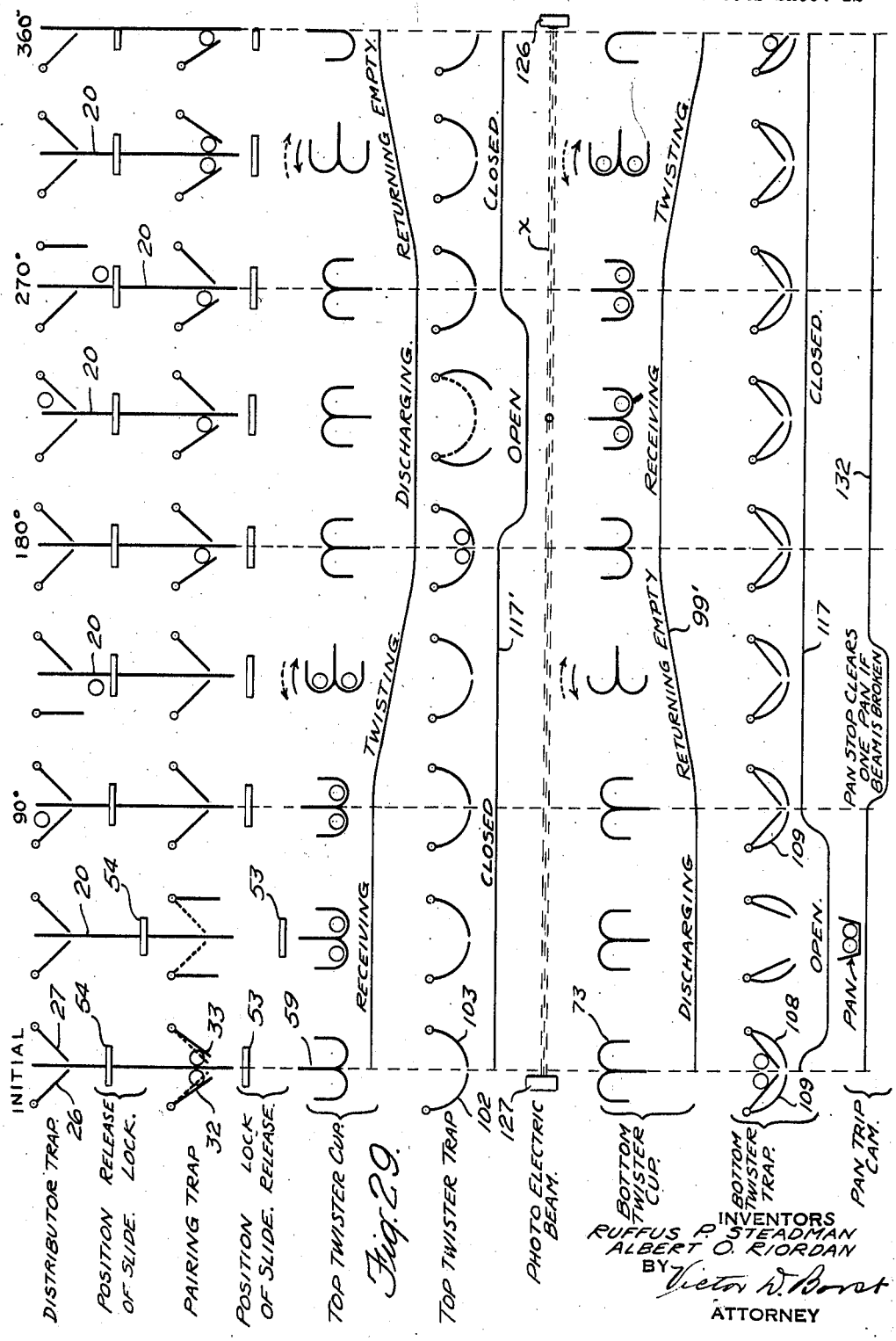

Patented Dec. 21, 1943

2,337,526

UNITED STATES PATENT OFFICE 2,337,526

DOUGH TWISTING MACHINE

Ruffus P. Steadman and Albert O. Riordan, Saginaw, Mich.; said Riordan assignor to Baker Perkins Inc., a corporation of New York Application October 7, 1941, Serial No. 413,924

21 Claims. (Cl. 107—8)

The bread baking industry has come generally to recognize the improvement in the bread that results from forming the unproofed loaf of two or more molded dough pieces twisted together or intertwined, and this practice is therefore followed quite extensively. Heretofore the twisting operation has been performed by hand, the operator for example laying two pieces or rolls of dough as they come from the molder either side by side or crossed and then successively crossing the ends a desired number of times. The twisted dough is then placed in a pan for proofing and baking.

The desirability of performing this operation automatically is manifest and many machines for the purpose have been proposed. So far as we are aware prior efforts to this end have failed. It is the aim of our invention to provide an automatic twisting machine which will meet all requirements and which can be produced economically and which will be simple, reliable and easy to operate.

Among the more specific objects of our invention is the provision of the requisite adjustments to make the machine sufficiently universal for all ordinary demands, the adjustments, for example, being calculated to vary the particular size and length of the rolls of dough, the capacity of the machine, the number of twists produced, the tightness of the twists and the speed of operation.

Another object is the provision of convenient automatic means which is adjustable for various lengths and widths of pans to advance the pans to and from receiving position in proper timing with the operation of the twister.

Another object is to provide necessary safeguards to assure the proper distribution of the rolls as they are fed from the molder and to prevent the feeding from one station to the next in the mechanism before the stations are ready to receive the rolls.

Still other objects and advantages of our invention will appear from the description of the illustrated embodiment.

The machine of our invention is designed as a mobile unit which can be readily coupled up with a standard prime molder and which automatically imparts the proper shape to the pieces received from the molder and feeds them in pairs at appropriately timed intervals and twists them into a symmetrical helix with a variable number of twists under the control of the operator and delivers the twisted loaves into pans which are automatically fed into and out of the mechanism in timed relation to the operation of the twister.

A characteristic of our twister is the fact that the twisting is performed in a plurality of stages, preferably two. The dough rolls are partially twisted in one unit and then are delivered into a second unit where the twisting is completed. Conveniently the intertwined dough is dropped by gravity into pans which are fed through the machine underneath the final twisting unit on a continuously running panning conveyor, means actuated by the passage of the dough through the twister being provided to control the advancing of the pans.

Specifically the twisting units comprise each a pair of double semi-cylindrical cup or trough members spaced apart on alined axes and oscillated through 180° oppositely from upright or receiving position to an inverted or dumping position and back again. The cups of the two units are out of phase 180° in their oscillation, those in one unit being inverted when those in the other unit are upright. The cups in the lower unit are spaced farther apart than the upper ones to provide room for the additional twist. The axes of the cups are longitudinally adjustable to vary the tightness of the twists and also, as will be seen, to make either a three twist or four twist product. The cups deliver onto traps which are opened at the proper time in the cycle of operation to deliver into the next repository.

To assure that the dough rolls will come through in proper sequence to the twisting units the invention contemplates a distributor-loader which pairs the dough rolls and allows them to pass through two by two by gravity in proper timed relation to the movement of the twisters and traps. In a convenient form of the invention a weight actuated gate member causes the dough rolls as they come into the hopper to pass alternately on opposite sides of a partition and two or more traps control the passage of the paired rolls to the first twister. These traps are biased to closed position and open under the weight of a roll of dough, but they interlock so that a roll cannot come into a trap that is already occupied. Also each pair of traps after the first can only open together, thus assuring that the pairing is maintained.

To feed the dough from the molder to the twister mechanism the invention contemplates an extender conveyor which will form the dough rolls to the proper length as they are being conveyed. This may consist of a conveyor belt preferably backed by a pressure plate and running above a lower pressure plate, the distance and angular relation between the two plates being adjustable.

Normally a motor will drive the extender conveyor and the panning conveyor at set speeds and the twisting mechanism is operated by another motor at a speed properly adjusted to that of the extender conveyor and molder. It has been found that the capacity of the machine may conveniently be between thirty and fifty twisted loaves per minute, with the individual dough pieces varying from 9 to 14 ounces and the pan sizes varying from 9 to 14 inches in length.

The invention also contemplates other details and features of construction as will hereinafter more fully appear.

The illustrative embodiment of the invention will now be particularly described after which the invention will be pointed out in claims.

Fig. 1 is a side elevation of a complete unit embodying the invention.

Fig. 2 is a transverse sectional elevation of the twisting mechanism on the broken line 2—2 of Fig. 1.

Fig. 3 is a sectional elevation on the line 3—3 of Fig. 2.

Fig. 4 is a sectional elevation on the line 4—4 of Fig. 2.

Fig. 5 is a sectional elevation on the line 5—5 of Fig. 2 with the top and bottom broken away.

Fig. 6 is an enlarged sectional detail of the extender conveyor taken on line 6—6 of Fig. 1.

Fig. 7 is a sectional detail of the same on line 7—7 of Fig. 6.

Fig. 10 is an enlarged transverse central sectional elevation of the twister mechanism with a portion at the top and bottom broken away.

Figs. 11 to 16, inclusive, show the cups and associated parts of the two twister units in successive positions to illustrate the twisting operation, Fig. 11 being a sectional elevation and Fig. 12 a sectional plan of the first cups with the pair of rolls laid in but before twisting, Figs. 13 and 14 being similar views after twisting, and Figs. 15 and 16 being similar views of the lower cups after twisting.

Figs. 17 and 18 are, respectively, a sectional elevation and plan of a pan with the twisted loaf deposited therein.

Figs. 19 to 22, inclusive, are similar views of the cups in the two units illustrating the adjustment and operation for producing a three twist loaf, Figs. 19 and 20 being a sectional elevation and plan, respectively, of the cups of the upper unit after twisting, and Figs. 21 and 22 being corresponding views of the cups of the lower unit after twisting.

Figs. 23, 24 and 25 are more or less diagrammatic views showing a modified form of twister cup in its initial, intermediate and final twisting position.

Fig. 26 is a fractional enlarged detail in perspective of a twister cup.

Fig. 27 is a schematic representation of the twister mechanism through one complete cycle of operation.

Figure 8:
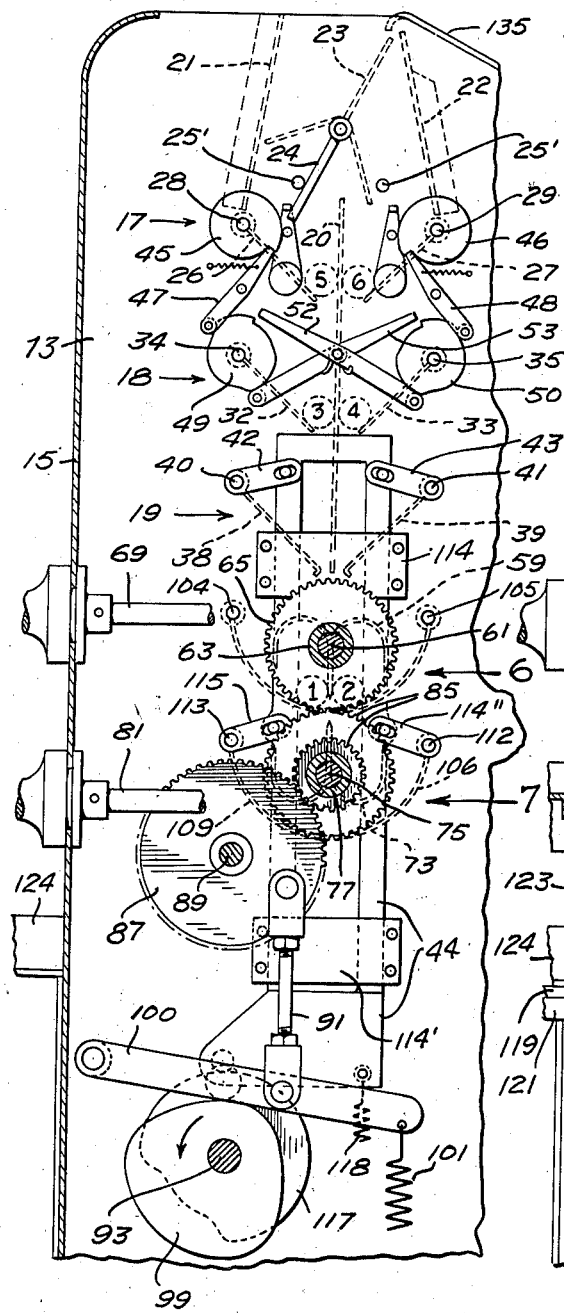
Fig. 8 is a view similar to Fig. 3 but showing the parts in their position at a different point in the cycle of operation.
Figure 9:
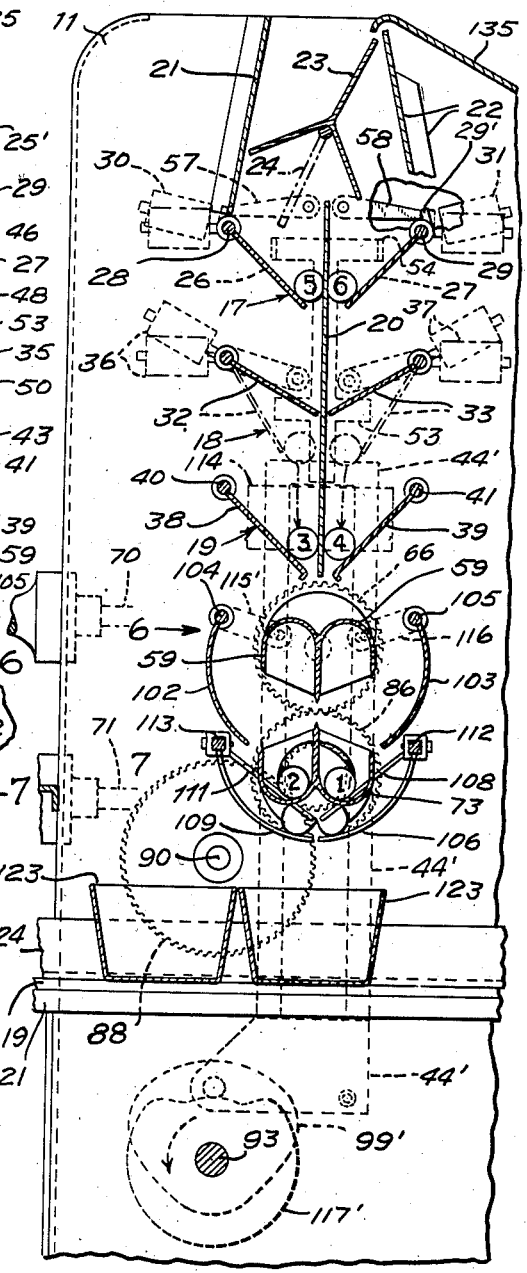
Fig. 9 is a view similar to Fig. 4 but showing the parts in their position at still another point in the cycle of operation.
Figure 28:
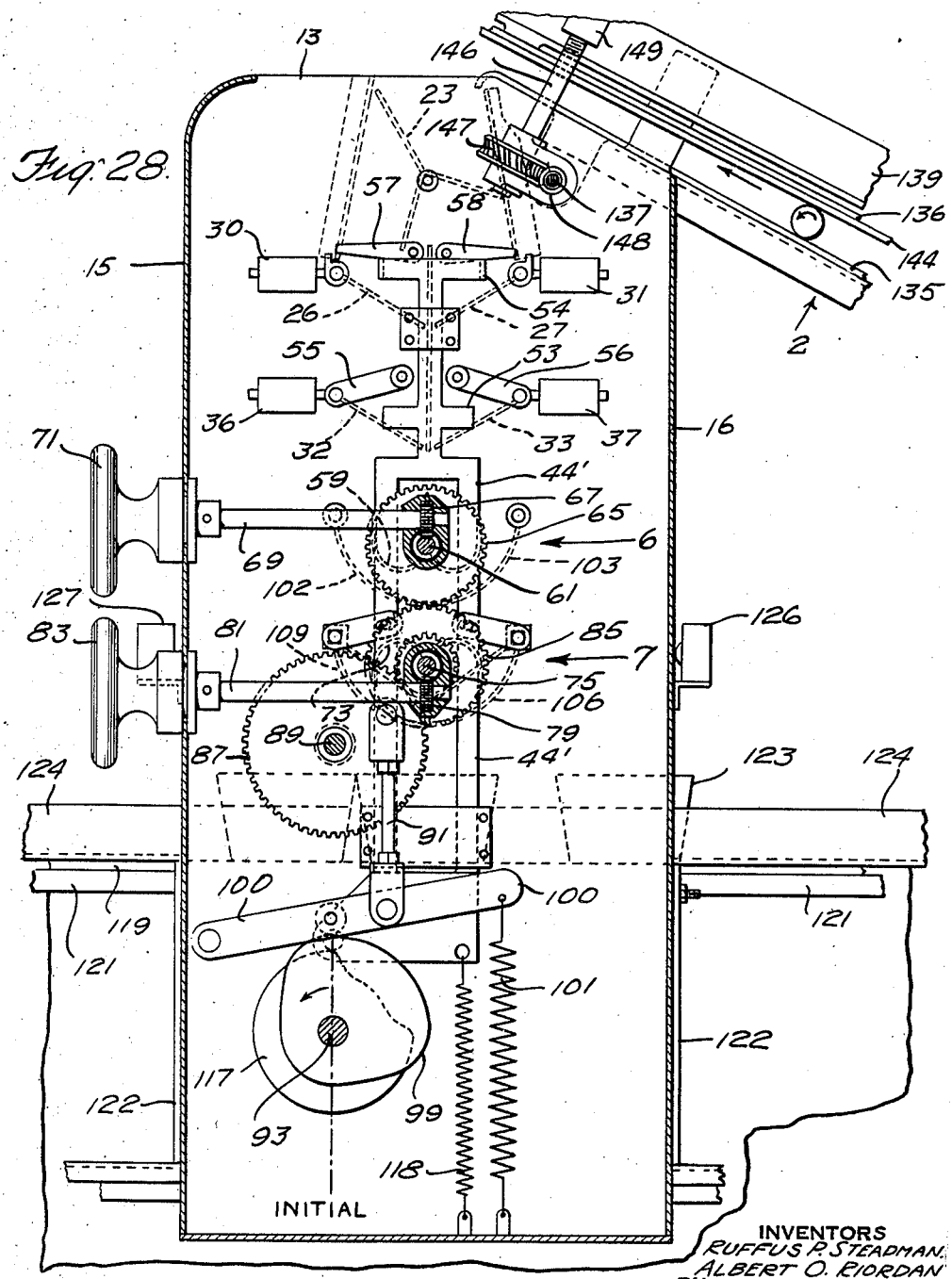

Fig. 28 is a sectional elevation corresponding to Fig. 3 of a modified form of twister mechanism.

Fig. 29 is a schematic representation of the twister mechanism shown in Fig. 28 through one complete cycle of operation.

The complete apparatus as shown in Fig. 1 is a unit consisting of a base structure 1, an extender conveyor 2 and the twisting mechanism 3, together with two motors and driving connections. The base structure is an elongated, oblong member composed of sheet metal 4 on its sides and ends strengthened with a channel frame 5, and open at its bottom and provided with a panning conveyor on its top as will later be described. The frame is mounted on casters disposed so as to provide a three point support which will best adapt itself to an uneven floor. The apparatus is thus rendered mobile and may be rolled to a position in front of the discharge end of a conventional prime loaf molder and securely clamped to it to prevent subsequent shifting or misalignment.

When so placed the extender conveyor receives the molded dough pieces from the prime molder (not shown), elongates them as will later be explained and delivers them into the twister mechanism where they are twisted together in pairs and delivered into pans which are advanced in proper order to the twisted loaf receiving station and delivered therefrom to the discharge point of the machine.

The twister mechanism will first be described. This mechanism is arranged so that the molded dough pieces pass through by gravity, first being paired and then accurately timed in their delivery to the twisting units. There are two twisting units, numbered generally 6 and 7, and above these are the stations constituting the distributor-loader. This may consist of two or more stations depending upon the degree of precaution felt necessary to assure orderly passage of the dough pieces through the mechanism. With a reliably operating prime molder and extender conveyor and proper flexibility in the relative speed adjustment of the twister mechanism, we have found two stations to be sufficient, but for purpose of illustration we have shown both three station and two station distributor-loader construction.

As shown for example in Fig. 2, the twister mechanism is contained in an upright, sheet metal frame the bottom of which fits and is secured within the side panels 4 of the base structure, and which extends substantially above the base. The frame is composed essentially of two side structures each of which is double walled. As viewed in Fig. 2 the right side frame structure consists of the two spaced walls 11 and 12 and the left side structure has walls 13 and 14. These are closed in front and rear by walls 15 and 16. At least one of the walls may be provided with removable portions to afford access to the interior of the enclosed side structure.

The distributor-loader shown in Figs. 1, 2, 3, 4, 5, 8, 9 and 10 has three stations numbered generally 17, 18 and 19. Each station consists of a trap formed of a pair of pivoted doors or trap members that meet in the middle on opposite sides of a central partition 20. The top trap 17 is a control trap and controls the escape of dough pieces from a hopper formed by the two transverse plates 21 and 22 that extend between the side frame structures and are spot welded or otherwise secured to the walls 11 and 13. The extender conveyor 2 delivers into this hopper.

The incoming rolls of dough are directed alternately on opposite sides of the partition 20 by a pivoted, dough weight operated gate member 23 of well known design. This gate has two legs flaring from the pivot, and an intermediate upstanding vane of a radial length to strike against the sides of the hopper and allow the gate to rotate far enough in each direction to cause the respective leg to clear the hopper side somewhat more than the diameter of a dough roll and bring the other leg up close to its side of the hopper. In the position shown in Fig. 4 the incoming dough roll will go to the right and in so doing will reverse the gate so that the next dough roll will go to the left. To prevent rebound an external arm 24 on the pivoted axis of the gate is positioned to strike pivoted weights 25 (Fig. 3) which absorb the inertia. If desired stop pins 25' on the side wall 13 may also be provided for the arm 24.

The trap members 26 and 27 for the control station 17 are fastened on transverse rock-shafts 28 and 29 that bear in the sides 11 and 13. Weights 30 and 31 bias these trap members to closed position.

The station 18 is directly underneath station 17 and has trap members in all substantial respects like those of station 17. This is the pairing station, that is it dumps when and only when there is a dough roll on both sides of the partition 20. The trap members 32 and 33 are fixed on rockshafts 34 and 35 parallel with shafts 28 and 29 and also bearing in the sides 11 and 13. Weights 36 and 37 bias these trap members to closed position.

The weights 30, 31, 36 and 37 are slightly in excess of the weight of the trap, and hence the traps of stations 17 and 18 are gravity operated to the closed position, there being an interlocking arrangement which will later be described that prevents untimely opening of one of these trap members under the weight of a roll of dough. Together these two traps constitute what we term the distributor-loader of the twister mechanism.

The station 19 is a loading station and is optional. It has a function in smoothing out and synchronizing the delivery of the paired rolls to the first twister unit, particularly at high speeds of operation. This function is performed by reason of the fact that it is positively opened and closed by the operating mechanism in precisely timed relation to the movement of the twisters. Not being gravity operated it cannot therefore get out of time. However, as will be seen, precautions are provided to keep the opening of the trap 18 properly synchronized. Therefore an acceptable construction and one which will later be described omits the station 19.

The trap members 38 and 39 of station 19 are fixed on rock-shafts 40 and 41 that are parallel to shafts 34 and 35 and bear in the sides 11 and 13. They are connected by links 42 and 43 (Fig. 3) to a cam operated slide 44 that will later be described, and thus are positively opened and closed.

It is obviously necessary that the control trap members 26 and 27 be prevented from opening while the trap members 32 and 33 are occupied. Also in order that station 18 shall pair the dough rolls it is necessary to prevent one from opening without the other. The interlocking arrangement to effect these results is shown in elevation in Figs. 3 and 8. On the end of the shafts 28 and 29 against the outer face of the side wall 13 are fixed one-toothed ratchets 45 and 46. Detents 47 and 48 are pivoted in position to cooperate with these ratchets to prevent rotation of the shafts 28 and 29.

On the corresponding end of shafts 34 and 35 are cam members 49 and 50 also having a single ratchet tooth. Cam rollers on the ends of detents 47 and 48 engage one edge cam portion of cams 49 and 50, respectively, the cams being so formed that the detents are swung out of engagement with their respective teeth on the ratchets 45 and 46 when the trap members 32 and 33 are in their biased positions, that is, when the station 18 is unoccupied. On a slight turning of the shafts 34 and 35, through approximately 15°, caused by the weight of the dough piece in the pairing trap, the cam rollers of the detents 47 and 48 roll off the high part of their cams and gravity draws the detents into locking position. This is the position shown in Fig. 3.

In a similar manner the pairing trap members 32 and 33 mutually interlock each other so that they can only open together. Crossed spring biased pivoted detents 51 and 52 coact with the single ratchet tooth on cams 49 and 50, respectively, to limit the free rotation of the shafts 34 and 35 to approximately 15°, or at most less than enough to let a dough roll through. This slight rotation, which of course occurs only under the influence of the weight of a dough roll, is enough to lock the shaft 28 or 29 immediately above. At the same time cam rollers on the detents 51 and 52 engage another cam portion on the respective cams 49 and 50 and are on the low part of the cams in the unoccupied position of the members 32 and 33 and are on the high part when the cams are rotated 15°. That is the condition shown in Figs. 3 and 8 when the cams have swung the detents 51 and 52 out of locking position.

Thus it will be seen that shaft 34 controls the movement of shafts 28 and 35, and shaft 35 controls the movements of shafts 29 and 34.

In addition to the safeguard afforded by this mutually interlocking arrangement of the control and loader traps, an additional safeguard is provided that is positively controlled in timed relation to the operation of the twisters and restrains the opening of these traps to their properly timed sequence in the operation of the mechanism. This additional safeguard is effected by a cam operated slide 44' on the side opposite the slide 44. This slide and its function will be fully described hereinafter, but at this point it will be noted that it has at its top an extension (Fig. 5) on which are two spaced cross arms 53 and 54. On the same end of the shafts 34 and 35 are arms 55 and 56, respectively, which are normally in the dotted position shown in Fig. 5. The cross arm 53 in the up position of the slide 44' allows the shafts 34 and 35 to rotate the 15° or thereabouts above mentioned before the arms 55 and 56 engage the cross arm 53 and further rotation is then prevented until the slide 44' descends.

Detents 57 and 58 normally engage fingers 28' and 29' on the shafts 28 and 29 and lock the shafts against rotation. However the cross arm 54 lifts the detents 57 and 58 out of the paths of the fingers 28' and 29' when the slide 44' is in up position. Thus when the slide 44' is in up position the control trap is released for opening and the loader trap is prevented from opening and is thus held ready to receive dough rolls from the control trap. Conversely when the slide 44' is down the control trap is locked shut and the loader trap is free to open. Thus when the trap members 32 and 33 (Fig. 3) are open, the trap members 26 and 27 are by these means as well as by the detents 47 and 48 prevented from opening and delivering directly to the storage trap.

From the loader trap 19 the pair of dough rolls are dropped into the first twisting unit 6. These twisting units, which are in general similar though differing in detail, will now be described.

The twisting elements are elongated, double, semi-cylindrical cups or trough members shown in detail in Fig. 26. As shown the partition between the cup components extends well above the outer edges of the cups in upright position. The inner surface of the cups is provided with small rounded elevations or nodules which prevent slippage of the dough rolls in the cups during twisting and yet do not puncture or tear the surface.

Each twisting unit has two axially alined but spaced cups and in the construction shown they are oscillated through substantially 180° in opposite directions. In the inverted position each delivers the partially or completely twisted loaf into a trap which is also positively opened and closed in proper sequence.

The two cups in the upper twister unit are numbered 59 and 60 (Fig. 10). Hub plates close the outer ends of the cups and provide attachment on to their respective shafts 61 and 62. These shafts bear in castings 63 and 64 attached to the outer walls 14 and 12, respectively, and in bushings in the walls 13 and 11, respectively. Between the casting and bushing a gear wheel, numbered 65 and 66 respectively, is keyed on each shaft with sliding key.

The two shafts 61 and 62 are longitudinally adjustable in their bearings to vary the spacing between the cups and hence the tightness of the twist imparted to the dough rolls, and also to vary their relation to the vertical center line of the machine for a reason which will presently appear. To effect this adjustment a rack is formed on the shaft for at least part of its length, and pinions 67 and 68, respectively, engage these racks. These pinions are on the inner ends of shafts 69 and 70, respectively, having handwheels 71 and 72 on their outer ends bearing in the front wall 15 of their respective side frame member.

The cups 73 and 74 of the lower twister unit are like the cups 59 and 60 except that they are shorter and hence are farther spaced. Their bearing and adjustment are also similar to the ones above. Their shafts 75 and 76, respectively, bear in castings 77 and 78, and their rack portions are engaged on the underside by pinions 79 and 80, respectively, on shafts 81 and 82 provided with hand-wheels 83 and 84 bearing in the front wall. Gear wheels 85 and 86 keyed with sliding keys on the respective shafts 75 and 76 mesh with the gear wheels 65 and 66, respectively.

The gear wheels 85 and 86 are double gears the pinions of which mesh with large gears 87 and 88, respectively, on shafts 89 and 90, respectively.

These large gears 87 and 88 are oscillated by connecting rods or pitmans 91 and 92, respectively, actuated from the transverse drive shaft 93 at the bottom of the frame. This drive shaft is driven from an electric motor 94 (Fig. 1) which is connected through a variable speed drive 95 to the shaft 93 through a sprocket and chain drive 96 and a reduction gear box 97 (Fig. 2). In the variable speed drive turning of the handwheel 98 slides the motor and vari-speed pulley along gibs and so causes the two parts of the vari-speed pulley to open or close and vary the ratio of the driving and driven pulleys.

The shaft 93 has secured on its opposite ends similar cams 99 and 99' (Figs. 2 and 10) the cam edges of which are divided into four equal quadrants. Pivoted above these cams are lever arms 100 and 100', respectively, which have cam rollers following the contour of the respective cams and are held in cam engagement by springs 101 and 101'. The lower ends of the connecting rods 91 and 92 are pivoted to the levers 100 and 100', respectively, outside the cam rollers.

The cams 99 and 99' are offset on the shaft 180° out of phase with the consequence that they oscillate the gears 87 and 88 simultaneously in opposite directions. Likewise the corresponding cups of the two twister units are set 180° out of phase, so that when the cups of one unit are upright those of the other unit are inverted, and vice versa. Likewise it is apparent that cups 59 and 60 rotate in opposite directions to each other and to the cups 73 and 74, respectively, though they all rotate the same amount since gears 65, 66, 85 and 86 have the same pitch diameters. The number of teeth on the various gears and the throw of the crank are so chosen that for each 360° rotation of the cams 99 and 99' the cups are rotated through 180° and back again.

The two twister units are bottomed by pivoted trap members. Unit 6 has trap members 102 and 103 fixed on rock shafts 104 and 105 that pivot in the side walls 11 and 13. These trap members are arcuate in cross-section and when closed they form a semi-cylindrical bottom, as distinguished from the trap members of the stations above which are plane and form a plane sided bottom sloping down to the center meeting line on opposite sides of the partition 29.

Unit 7 has a more complicated trap construction. Each trap member consists of two outer short quarter-cylindrical parts of a diameter to clear the cups 73 and 74, and between them a plurality of spaced straight fingers that meet with their opponents to form a V-trough the apex of which is some distance above the meeting line of the quarter-cylindrical parts.

Specifically these multi-part trap members consist on the one side of the quarter-cylindrical parts 106 and 107 and the intermediate straight fingers 108 (Figs. 2 and 10), and on the other side of the quarter-cylindrical parts 109 and 110 and the intermediate straight fingers 111. These two trap members are adjustably fixed on rock shafts 112 and 113, respectively (Figs. 3 and 4).

The cam actuated slides 44 and 44' have previously been referred to. They are disposed on the outer faces of side walls 13 and 11, respectively, and are constrained by guides 114 and 114' to slide vertically. As shown they are in the form of hollow rectangles and straddle the shafts 61 and 75 on the one side and 62 and 76 on the other side.

As above stated the loader trap members 38 and 39 are operatively connected to the upper end of slide 44 by links 42 and 43. Similarly rock shafts 112 and 113 are operatively coupled to the slide 44 by links 114'' and 115'. On the other side the rock shafts 104 and 105 are operatively coupled to slide 44' by links 115 and 116. Therefore it is clear that the raising and lowering of slide 44 will close and open the loader trap and the bottom twister trap, and the raising and lowering of slide 44' will close and open the top twister trap.

These slides are operated by cams 117 and 117' on the shaft 93 just outside the sides 13 and 11, respectively. These cams are similar in shape and have a high dwell of 270°, a low dwell of 45°, and a rise and fall of 22½° each. They are engaged by rollers on the respective slides 44 and 44' which are urged down into cam engagement by springs 118 and 118'.

The two cams 117 and 117' are angularly offset 180° with the result that the opening of the traps controlled thereby will occur 180° apart.

Underneath the bottom twister unit runs the panning conveyor 119. This conveyor is a continuous link chain conveyor running over pulleys supported in the top of the base 1. One of these pulleys is driven through a reduction sprocket and chain drive from a motor 120 mounted in the base (Fig. 1). The chain runs in channel guides 121 secured on top and bottom of transverse plates 122 (Fig. 3) in the base and contacting the walls 15 and 16 of the twister frame. The pans 123 are fed in from the front of the machine and are carried along by the conveyor until they are stopped by a retractable stop finger or trigger in their path located to bring a pan to rest immediately underneath the bottom twister unit. As long as the finger protrudes the conveyor slides under the pans but as soon as the finger is retracted the pans move with the conveyor until stopped again by the finger.

The pans are guided laterally by adjustable angle members 124 which are secured on top of the plates 122 and made adjustable to provide for different length pans and hence different size loaves.

Automatic means are provided to index or advance the pans one step at a time at proper intervals, the empty pans being thus brought up to loading position and the filled pans being taken on for manual or automatic removal, as for example, by a deflector 125.

The construction shown for automatically indexing the pans is controlled by a photoelectric cell. This mechanism will now be described.

On a bracket on the wall 16 is a source of light 126 (Figs. 3 and 4) which directs a horizontal beam of light $x$ from rear to front between the two twister units 6 and 7 so as to be interrupted by a partially twisted loaf dropping from the trap of unit 6 into the cups of unit 7. This beam falls upon a photoelectric cell 127 which controls a solenoid 128 (Fig. 4). The armature of this solenoid controls a bell-crank lever 129 the upright leg of which provides a latch for a pivoted lever 130 the free end of which is urged downwardly by a spring 131.

A pan indexing cam 132 is secured on the shaft 93 and is engaged by a roller 130' on the lever 130. When the roller rides into a depression in the cam the free end of the lever 130 will if released by the latch be drawn down by the spring 131 and depress a stop finger or trigger 133. As shown in Fig. 2 the trigger is in the form of a hollow oblong and the lever extends through the opening in the trigger and will depress it when other conditions permit it. The trigger is mounted so as to have substantially vertical movement and is urged upwardly into the path of the pans by a spring 134 (Fig. 4).

When a loaf drops from the upper to the bottom twister unit and breaks the beam of light the photoelectric cell causes the solenoid 128 to be energized and attract its armature and rock the latch arm to the right and unlatch lever 130. This lets the roller 130' ride on the surface of cam 132 but nothing occurs until the roller rides into the cam depression. Then the spring 131 pulls the free end of lever 130 down and retracts the trigger 133. By that time the second twisting is done and the loaf is delivered into the pan underneath unit 7. The pan being now unrestrained, it moves along with the chain conveyor. The trigger is promptly released since the cam depression extends but a short angular distance on the periphery of the cam, and the trigger rides underneath the pan until it gets out of the way when it snaps back into the path of the next pan which is empty and which is thus held to take its loaf. The operation is then repeated.

The twisting operation is illustrated in Figs. 11 to 18 inclusive. The first two figures show the dough rolls as they are delivered into the top twister. The next two figures show the condition when the cups have been rotated oppositely 180° with the partially twisted loaf on the trap ready to drop into the next unit. The next two figures show the condition after the lower cups have turned through 180° and completed the twisting, the twisted loaf resting on the trap. In Figs. 17 and 18 the twisted loaf is shown as it appears when delivered into the pan.

Fig. 27 illustrates diagrammatically the sequence of steps. This is a development of a 360° cycle and the last vertical line therefore represents a recurrence of the same condition as exists at the first line. The intermediate vertical lines represent divisions into successive 90° intervals.

First it will be seen that the loader trap is occupied and cam 117 is just about to open this trap and let the pair of dough rolls drop into the top twister unit 6. This is the condition shown in Fig. 3, for example. At this point the cups 59 and 60 are upright, the trap for this unit is closed, cups 73 and 74 are inverted and the trap for that unit is also just about to be opened since the same cam controls it as controls the loader trap.

During the next quadrant the loader trap and the bottom twister trap are opened and their loads discharged, the one to the top twister cups and the other to the waiting pan.

During the next quadrant the top twister cups twist and dump, the bottom twister cups return to upright and the pan is indexed. This is the condition shown in Fig. 8.

During the next quadrant the top twister trap is opened by slide 44' and the partially twisted loaf is delivered to the bottom cups. This is the condition shown in Fig. 9.

During the next quadrant the twisting is completed by the bottom cups and a pair of dough rolls is received by the loader trap, with the result that conditions are as they were at the start.

The progress of the dough rolls down to the loader trap is illustrated in Fig. 4. Six rolls numbered for convenience in the order of their admission are there shown. It will be understood that this represents an efficient but not exclusive operating condition. The gate 23 is about to rotate under the weight of dough roll 6 to drop that roll on the right side of partition 20. Roll 5 cannot drop through until the pairing trap is empty. And the pairing trap cannot open until slide 44' descends and cross arm 53 releases that trap. That will not occur for another 180° since slide 44 which controls the loader trap is about to descend and open that trap. The control trap cannot open until the pairing trap has delivered its charge which requires the descent of slide 44'.

In Figs. 28 there is shown a modified form in which the loader trap is omitted and the pairing trap delivers directly into the top twister cups, the functions of stations 18 and 19 of the previous construction being combined in one station which becomes the pairing-loading station. This change makes it necessary to reverse the cams and slides since the order of operation of the twisting units relative to that of the pairing unit is advanced one step. The interlocking arrangement between the two top traps is the same as before but is transferred to the other side.

The mechanism is shown empty but the progress of rolls through the mechanism may easily be traced. This will perhaps best be seen by reference to Fig. 29. With the parts in the position shown, that is, with slide 44' raised, the control trap is free so far as the cross arm 54 is concerned, but since dough rolls are shown in the pairing trap the interlock on the other side holds the trap members 26 and 27 from rotating if a dough roll should fall into either.

The pairing trap is assumed and shown to be occupied. The roller on slide 44' is just about to enter the low part of cam 117 (Fig. 28) so during the first quadrant the pairing trap opens and delivers to the top twister cups. At the same time the bottom twister trap is assumed to be occupied and this also opens with the descent of slide 44' and drops the twisted loaf into the pan.

Of course dough rolls may come in to the hopper off the extender conveyor at any time, but it is typical to have one come in about at the end of the first quadrant, as indicated. That will drop right through to the pairing trap since that trap is now empty, but it can go no further since cross arm 53 has again been raised and now prevents it. Therefore at the end of the second quadrant there is one roll in the pairing trap and the top twister unit has completed its partial twisting and has discharged onto the top twister trap. The bottom cups have returned to their receiving position.

During the third quadrant the top twister trap opens and delivers into the bottom twister cups. This breaks the beam of light and drops the roller 130' on to the cam 132 ready to drop into the cam depression when it comes around. That occurs in the second quadrant after the bottom twister trap has opened and delivered into the pan in the first quadrant. The cam 132 is set accordingly on the shaft 93.

It is assumed that a second roll comes into the hopper during this third quadrant. It too falls directly through into the pairing trap since the slide 44' is still up, so that by the fourth quadrant the pairing trap is again loaded.

During the fourth quadrant the only thing that occurs is the rotation of the twister cups, the top cups to return to receiving position and the bottom cups to twist and dump. Therefore at the end of 360° the conditions are the same as they were at the start, and the cycle is repeated.

The longitudinal adjustment of the twister cups by manipulation of the hand-wheels 71, 72, 83 and 84 not only regulates the tightness of the twist but may also be employed to vary the number of twists imparted to the loaf. In the adjustment illustrated in Figs. 11 to 16, inclusive, the rolls are given four twists, one by each of the four cups. In Figs. 19 to 22, inclusive, there is shown an adjustment under which one of the cups does not function upon the rolls and therefore the rolls are given three twists.

The dough rolls in either case come through symmetrical with respect to the center line of the mechanism, but the cups are adjusted so as to be offset with respect to the center line. The adjustment in these figures is to the left. The double twist made by the upper cups 59 and 60 is therefore toward the left end of the dough rolls. When dropped into the lower twister unit the twisted end of the dough rolls misses cup 73 and therefore only the cup 74 in this unit makes a twist.

A modified form of cup is shown in Figs. 23, 24 and 25. In this construction the cup 134 is a single cup and the straight edge on the opposite side of the axis is adapted to engage the dough roll end which is not in the cup and push it over to the opposite side of the trap during the twisting movement of 180°, while the cup lifts up its dough roll end and deposits it where the other roll end was. Thus the two ends are reversed and a twisting effected.

The dough rolls are numbered in Figs. 23, 24 and 25 to make this clear. As deposited into the twister unit dough roll numbered 1 is shown at the left in Fig. 23. As shown in Fig. 24 the cup has made a partial rotation in the twisting direction. In Fig. 25 the rotation is completed and the ends have been reversed. While this type of cup has been operated satisfactorily the double cup type is preferred.

The extender-conveyor 2 (Fig. 1) consists of an inclined pressure board or plate 135 the upper end of which overhangs the hopper and which is hinged at its upper end and adjustable for height at its lower end. This plate is disposed below and in spaced relation to a second inclined pressure plate 136 which is hinged at its lower end and adjustable for height at its upper end. The lower end of the bottom plate 135 is curved up as shown in Fig. 1 to receive dough pieces from the prime molder (not shown).

The exact construction by which the plates are made adjustable in the manner stated is not material. For the purpose of illustration one possible construction is shown. The lower plate is trunnioned upon a shaft 137 which extends through and bears in bushings in the frame walls 11, 12, 13 and 14 (Fig. 6) in the upper rear corner of the frame of the twister mechanism. As shown integral lugs on the plate bear upon reduced inner ends of the bushings in the walls 11 and 13. The shaft 137 has a handle 138 on its outer end and is employed to raise and lower the free end of the upper plate through mechanism presently to be described.

The upper plate 136 is the bottom member of a frame 139 that is trunnioned at its lower end upon a shaft 140 mounted in bearings in upwardly extending brackets 141 on the rear end of the base 4. At the upper end of the frame 139 and mounted in adjustable bearing blocks is another transverse shaft 141' parallel to the shaft 140. On the lower shaft 140 between the frame bearings is a belt driving pulley 142 driven from the motor 120 as indicated in Fig. 1. On the shaft 141' is an idler or take-up pulley 143 of the same length as the driver. A flexible endless belt 144 of the full width of the lower pressure plate is mounted on these pulleys. The belt 144 is underneath the upper pressure plate 136 and in contact therewith so that the plate acts as a backing for the belt.

The mechanism for raising and lowering the upper end of the frame 139 is shown in some detail in Figs. 6 and 7. Bifurcated castings 145 have their two arms trunnioned on shaft 137, one within each side frame. The body of each of these castings is bifurcated in the plane of the shaft 137 and is cored at right angles to the shaft to receive the lower end of a screw 146. A worm wheel 147 in this latter bifurcation is fixed on the respective screw 146 and engages a worm 148 on the shaft 137. The rotation of shaft 137 therefore causes rotation of the screws 146.

The screws 146 have threaded engagement in lugs 149 that are fixed on the outer ends of a transverse shaft 150 that bears in the side members of the adjustable frame. Turning of the hand-wheel 138 therefore raises and lowers the upper end of the frame and therefore of the upper pressure plate 136.

The raising and lowering of the lower end of the lower pressure plate is effected by a hand-wheel 151 through any suitable connections, which may for example be like those above described for adjusting the upper pressure plate about its pivot axis.

Dough pieces introduced between the lower pressure plate and the surface of the belt at its lower end, in the direction of belt travel will, when the belt is running and the pressure plates are properly adjusted, be carried up the incline by being rolled over the surface of the lower pressure plate by the belt and at the same time will be subjected to pressure, the intensity of which depends upon the space between the two pressure plates. This action not only conveys the dough piece up the incline, meanwhile keeping its axis at right angles to the line of travel, but it also elongates the piece to the desired dimension. The adjustments keep the two pressure boards parallel laterally but permit them to be made to converge or diverge longitudinally.

Laterally adjustable longitudinal guides (not shown) are fitted between the two pressure plates to control the length of the extended dough pieces. These may well be similar to the pan guides 124.

When the machine is in operation in conjunction with a conventional loaf molder, the single dough pieces are introduced between the pressure plates at the lower end directly from the discharge of the molder and are elevated, elongated and conveyed to the distributor-loader into which they are discharged singly, their axes parallel and horizontal.

It is obvious that various modifications may be made in the construction shown and above particularly described within the principle and scope of the invention as pointed out in the following claims. For instance the twisting cups may be so operated that instead of reversing in direction to return to the receiving position from their inverted or discharge position they may after a slight pause for discharge continue their rotation in the same direction, and it is our intention that the term "oscillate" shall be comprehensive of both modes of operation. Also it will be understood that while the relative angular offsetting and rotation of the respective cups is said to be 180°, that figure is not intended to be limiting but to comprehend such relative positions and movements as will accomplish the results.

We claim:

1. Apparatus for twisting dough including two twisting units disposed one above the other, each unit comprising two spaced double cup members mounted for rotation on fixed alined axes, the two cup members of each unit having the same angular setting and those of the two units being 180° out of angular phase, and means to oscillate the four cup members simultaneously on their fixed axes through 180° and operative to rotate the members of each unit and the adjacent members of the two units oppositely.

2. Apparatus for twisting dough including two twisting units disposed one above the other, each unit comprising two spaced double cup members mounted for rotation on fixed alined axes, the two cup members of each unit having the same angular setting and those of the two units being 180° out of angular phase, means to oscillate the four cup members simultaneously on their fixed axes through 180° and operative to rotate the members of each unit and the adjacent members of the two units oppositely, pivoted trap members between the two twisting units adapted temporarily to receive and retain partially twisted dough pieces from the upper cup members, and movable control means for the trap members coordinated with the oscillating means.

3. Apparatus for twisting dough including two twisting units disposed one above the other, each unit comprising two spaced double cup members mounted for rotation on fixed alined axes, the two cup members of each unit having the same angular setting and those of the two units being 180° out of angular phase, means to oscillate the four cup members simultaneously on their fixed axes through 180° and operative to rotate the members of each unit and the adjacent members of the two units oppositely, pivoted trap members immediately above the upper twisting unit, pivoted trap members between the two twisting units adapted temporarily to receive and retain partially twisted dough pieces from the upper cup members, separate control means for the two trap members, and means actuated in conjunction with the oscillating means and operative to release the two control means temporarily at times 180° apart in the cycle of operation of the oscillating means.

4. Apparatus for twisting dough including two twisting units disposed one above the other, each unit composed of two spaced rotative cup members mounted for rotation on alined axes, the spacing of the cup members in the lower unit being greater than that in the upper unit, and means to oscillate the two members of each unit through 180° in opposite directions.

5. Apparatus for twisting dough including two twisting units disposed one above the other, each unit composed of two spaced rotative cup members mounted for rotation on alined axes, the spacing of the cup members in the lower unit being greater than that in the upper unit, and means to oscillate the four cup members simultaneously through 180° and operative to rotate the members of each unit and the adjacent members of the two units in opposite directions.

6. Apparatus for twisting dough including two twisting units disposed one above the other, each unit composed of two spaced rotative cup members mounted for rotation on alined axes, the spacing of the cup members in the lower unit being greater than that in the upper unit, means to oscillate the four cup members simultaneously through 180° and operative to rotate the members of each unit and the adjacent members of the two units in opposite directions, a pair of trap members between the two units adapted temporarily to receive and retain partially twisted dough pieces from the upper cup members, and means to open the trap members operated in timed relation to the movement of the cup members.

7. An apparatus for twisting dough including a twisting unit comprising a pair of pivoted, arcuate trap members forming when closed an arcuate bottom, a cup member in each end of the unit mounted for rotation upon the axis of the arcuate bottom and having one longitudinal edge cupped and the other straight and being of a width on each side of its axis substantially equal to the radius of the bottom, and means to oscillate the cup members oppositely through 180°, whereby they will reverse the respective ends of dough pieces disposed upon the trap members on opposite sides of the cup members.

8. An apparatus for twisting dough including a twisting unit comprising a pair of pivoted, arcuate trap members forming when closed an arcuate bottom, a cup member in each end of the unit mounted for rotation upon the axis of the arcuate bottom and having one longitudinal edge cupped and the other straight and being of a width on each side of its axis substantially equal to the radius of the bottom, means to oscillate the cup members oppositely through 180°, and means for opening the trap members at the end of the first 180° movement of the cup members.

9. Apparatus for twisting dough including two twisting units disposed one above the other, each unit comprising two spaced double cup members mounted for rotation on alined axes and each cup having a nodulated surface designed to increase the frictional grip upon a dough piece without rupturing the surface, the two cup members of each unit having the same angular setting and those of the two units being 180° out of angular phase, and means to oscillate the four cup members simultaneously through 180° and operative to rotate the members of each unit and the adjacent members of the two units oppositely.

10. Apparatus for twisting dough including two twisting units one above the other and each comprising two spaced cup members rotatively mounted upon alined axes, means to adjust the spacing between the cup members of each unit, and means to oscillate the four cup members simultaneously through 180° and operative to rotate the members of each unit and the adjacent members of the two units oppositely.

11. Apparatus for twisting dough including a frame, two twisting units one above the other and each comprising two alined shafts bearing in opposite sides of the frame and each having a rack portion, a manually actuatable pinion engaging each rack portion and operative to adjust the respective shaft longitudinally in its bearing, a double cup secured on the inner end of each shaft and of a length to leave a space between them, the cups in the lower unit being shorter than those in the upper unit, and means to oscillate the four shafts through 180° simultaneously and operative to rotate the shafts of each unit and the adjacent shafts of the two units oppositely.

12. Apparatus for twisting dough including a frame, two twisting units one above the other and each comprising two alined shafts bearing in opposite sides of the frame and each having a rack portion, a manually actuatable pinion engaging each rack portion and operative to adjust the respective shaft longitudinally in its bearing, a double cup secured on the inner end of each shaft and of a length to leave a space between them, the cups in the lower unit being shorter than those in the upper unit, means to oscillate the four shafts through 180° simultaneously and operative to rotate the shafts of each unit and the adjacent shafts of the two units oppositely, pivoted trap members beneath each pair of double cups forming a bottom for the respective unit and adapted to be swung to open and closed positions, and operating means for the trap members coordinated with the oscillating means.

13. Apparatus for twisting dough including a frame, two twisting units in the frame one above the other and each comprising two alined shafts bearing in opposite sides of the frame and a cup member secured on the inner end of each shaft of a length to provide a space between them, a gear on each shaft, those on the same side meshing together, a crank on each side of the frame having a geared connection with one of said gears on the respective side, a cam shaft, and two similar cams on the shaft, one cam having operative connection with each crank and adapted to oscillate the crank with each rotation of the cam shaft, the geared connection being such that the cup members are oscillated through 180° with each oscillation of the crank, and the two cams being set 180° out of phase.

14. Apparatus for twisting dough including a frame, two twisting units in the frame one above the other and each comprising two alined shafts bearing in opposite sides of the frame and a cup member secured on the inner end of each shaft of a length to provide a space between them, a gear on each shaft, those on the same side meshing together, a crank on each side of the frame having a geared connection with one of said gears on the respective side, a cam shaft, and two similar cams on the shaft, one cam having operative connection with each crank and adapted to oscillate the crank with each rotation of the cam shaft, the geared connection being such that the cup members are oscillated through 180° with each oscillation of the crank, the two cams being divided into four substantially equal quadrants and being set 180° out of phase.

15. Apparatus for twisting dough including a frame, two twisting units in the frame one above the other and each comprising two alined shafts bearing in opposite sides of the frame and a cup member secured on the inner end of each shaft of a length to provide a space between them, a gear on each shaft, those on the same side meshing together, a crank on each side of the frame having a geared connection with one of said gears on the respective side, a cam shaft, and two similar cams on the shaft, one cam having operative connection with each crank and adapted to oscillate the crank with each rotation of the cam shaft, the geared connection being such that the cup members are oscillated through 180° with each oscillation of the crank, and the two cams being set 180° out of phase; trap members underneath the cup members in each unit adapted to open and close, separate actuating means for the trap members, and two similar cams controlling the actuating means set 180° out of phase and coordinated with the oscillation producing cams.

16. Apparatus for twisting dough including a frame, two twisting units in the frame one above the other and each comprising two alined shafts bearing in opposite sides of the frame and a cup member secured on the inner end of each shaft of a length to provide a space between them, a gear on each shaft, those on the same side meshing together, a crank on each side of the frame having a geared connection with one of said gears on the respective side, a cam shaft, and two similar cams on the shaft, one cam having operative connection with each crank and adapted to oscillate the crank with each rotation of the cam shaft, the geared connection being such that the cup members are oscillated through 180° with each oscillation of the crank, and the two cams being set 180° out of phase; a pair of pivoted trap members underneath the cup members in each unit adapted to swing to open and closed position, a slide on each side of the frame, links operatively connecting each slide with one pair of trap members, means biasing the slides to one position, and a cam for actuating each slide against its bias, the two cams being similar and mounted for synchronous movement and being set 180° out of phase.

17. Apparatus for twisting dough including a frame, two twisting units in the frame one above the other and each comprising two alined shafts bearing in opposite sides of the frame and a cup member secured on the inner end of each shaft of a length to provide a space between them, a gear on each shaft, those on the same side meshing together, a crank on each side of the frame having a geared connection with one of said gears on the respective side, a cam shaft, and two similar cams on the shaft, one cam having operative connection with each crank and adapted to oscillate the crank with each rotation of the cam shaft, the geared connection being such that the cup members are oscillated through 180° with each oscillation of the crank, and the two cams being set 180° out of phase; a pair of pivoted trap members underneath the cup members in each unit adapted to swing to open and closed position, a slide on each side of the frame, links operatively connecting each slide with one pair of trap members, means biasing the slides to one position, and a cam for actuating each slide against its bias, the two cams being similar and mounted for synchronous movement and being set 180° out of phase; a pair of pivoted delivery traps immediately above the upper twisting unit, and means carried by the slide in control of the trap members under the lower twisting unit for controlling the delivery traps.

18. Apparatus for twisting dough including a frame, two twisting units in the frame one above the other and each comprising two alined shafts bearing in opposite sides of the frame and a cup member secured on the inner end of each shaft of a length to provide a space between them, a gear on each shaft, those on the same side meshing together, a crank on each side of the frame having a geared connection with one of said gears on the respective side, a cam shaft, and two similar cams on the shaft, one cam having operative connection with each crank and adapted to oscillate the crank with each rotation of the cam shaft, the geared connection being such that the cup members are oscillated through 180° with each oscillation of the crank, and the two cams being set 180° out of phase; a pair of pivoted trap members underneath the cup members in each unit adapted to swing to open and closed position, a slide on each side of the frame, links operatively connecting each slide with one pair of trap members, means biasing the slides to one position, and a cam for actuating each slide against its bias, the two cams being similar and mounted for synchronous movement and being set 180° out of phase; a pair of pivoted delivery traps immediately above the upper twisting unit, and a pair of links operatively connecting the delivery traps to the slide in control of the trap members under the lower twisting unit.

19. An apparatus for twisting dough comprising two twisting units disposed one above the other and including rotative cup members shaped to dump when the members are inverted and coupled to rotate 180° out of phase, whereby one is dumping when the other is receiving, a pan conveyor underneath the lower unit, a stop member biased to extend above the conveyor in the path of the pans, and means to retract the stop member comprising a light source positioned to direct a beam of light between the two units, a photoelectric cell in the path of the beam, a solenoid controlled by the cell, and tripping means actuated by the solenoid.

20. An apparatus for twisting dough comprising two twisting units disposed one above the other and including rotative cup members shaped to dump when the members are inverted and coupled to rotate 180° out of phase, whereby one is dumping when the other is receiving, a pan conveyor underneath the lower unit, a stop member biased to extend above the conveyor in the path of the pans, and means to retract the stop member comprising a light source positioned to direct a beam of light between the two units, a photoelectric cell in the path of the beam, a solenoid controlled by the cell, a cooperative cam and cam follower, means for constantly rotating the cam, a pivoted arm carrying the cam follower and operative to withdraw the stop member under the influence of the cam on the cam follower, a latch member biased normally to restrain the arm from withdrawing movement, and means actuated by the solenoid for tripping the latch member.

21. An apparatus for twisting dough including two twisting units disposed one above the other, each unit comprising two spaced cup members mounted for rotation on alined axes, the two cup members of each unit having the same angular setting and those of the two units being substantially 180° out of angular phase, and means to rotate the four cup members simultaneously on their axes at substantially the same angular speed and operative to rotate the two members of each unit and the adjacent members of the two units oppositely.

R. P. STEADMAN.
A. O. RIORDAN.